US010523598B2

(12) United States Patent
Lu et al.

(10) Patent No.: US 10,523,598 B2
(45) Date of Patent: Dec. 31, 2019

(54) MULTI-PATH VIRTUAL SWITCHING

(71) Applicant: Futurewei Technologies, Inc., Plano, TX (US)

(72) Inventors: Yunsong Lu, Mountain View, CA (US); Wenzhe Zhou, Cupertino, CA (US); Yan Chen, Dublin, CA (US)

(73) Assignee: Futurewei Technologies, Inc., Plano, TX (US)

( * ) Notice: Subject to any disclaimer, the term of this patent is extended or adjusted under 35 U.S.C. 154(b) by 278 days.

(21) Appl. No.: 15/089,870

(22) Filed: Apr. 4, 2016

(65) Prior Publication Data
US 2017/0289067 A1 Oct. 5, 2017

(51) Int. Cl.
*H04L 12/931* (2013.01)
*H04L 12/24* (2006.01)
*H04L 12/707* (2013.01)
*H04L 12/851* (2013.01)
*H04L 12/703* (2013.01)
(Continued)

(52) U.S. Cl.
CPC .......... *H04L 49/70* (2013.01); *H04L 41/0654* (2013.01); *H04L 41/0896* (2013.01); *H04L 45/24* (2013.01); *H04L 47/24* (2013.01); *H04L 49/354* (2013.01); *H04L 45/28* (2013.01); *H04L 45/586* (2013.01); *H04L 47/125* (2013.01)

(58) Field of Classification Search
CPC ..... H04L 49/70; H04L 41/0654; H04L 45/24; H04L 45/28; H04L 45/586; H04L 47/125; H04L 47/24; H04L 49/354
See application file for complete search history.

(56) References Cited

U.S. PATENT DOCUMENTS

| 7,720,053 | B2 * | 5/2010 | Hussain | H04L 45/00 |
| | | | | 370/386 |
| 2003/0158953 | A1 * | 8/2003 | Lal | H04L 29/06 |
| | | | | 709/230 |

(Continued)

FOREIGN PATENT DOCUMENTS

| CN | 101410803 A | 4/2009 |
| CN | 102968344 A | 3/2013 |

(Continued)

OTHER PUBLICATIONS

"International Application No. PCT/CN2017/079145, International Search Report and Written Opinion dated Jun. 28, 2017", (Jun. 28, 2017), 6 pgs.

(Continued)

*Primary Examiner* — Ian N Moore
*Assistant Examiner* — Latresa A McCallum
(74) *Attorney, Agent, or Firm* — Schwegman Lundberg & Woessner, P.A.

(57) ABSTRACT

A virtual switch for packet switching includes an ingress traffic steering manager executing on circuitry and coupled to receive packets from multiple virtual machines or containers, multiple data plane providers, each data plane provider having a data path coupled to selectively receive the packets from the ingress traffic steering manager, and wherein the ingress traffic steering manager classifies the received packets and selects available data paths based on the classification of the packets and a set of distribution rules.

20 Claims, 3 Drawing Sheets

(51) Int. Cl.
  *H04L 12/713* (2013.01)
  *H04L 12/803* (2013.01)

(56) References Cited

U.S. PATENT DOCUMENTS

| | | | |
|---|---|---|---|
| 2004/0114536 A1* | 6/2004 | O'Rourke | H04L 29/06027 370/252 |
| 2004/0223470 A1* | 11/2004 | Smith | H04L 63/10 370/332 |
| 2007/0171921 A1 | 7/2007 | Wookey et al. | |
| 2010/0061389 A1* | 3/2010 | Sindhu | H04L 49/00 370/412 |
| 2011/0004876 A1 | 1/2011 | Wu et al. | |
| 2012/0290703 A1 | 11/2012 | Barabash et al. | |
| 2013/0058208 A1 | 3/2013 | Pfaff et al. | |
| 2013/0332602 A1 | 12/2013 | Nakil et al. | |
| 2013/0343399 A1* | 12/2013 | Kandula | G06F 9/5077 370/412 |
| 2015/0016266 A1 | 1/2015 | Dumitrescu et al. | |
| 2015/0019702 A1* | 1/2015 | Kancherla | H04L 47/125 709/223 |
| 2015/0172331 A1* | 6/2015 | Raman | H04L 65/403 709/204 |
| 2015/0181499 A1* | 6/2015 | Azuma | H04L 41/0803 370/231 |
| 2015/0280939 A1 | 10/2015 | Sindhu | |
| 2015/0281087 A1* | 10/2015 | Jalan | H04L 47/125 370/235 |
| 2016/0142301 A1* | 5/2016 | Anand | H04L 45/54 370/389 |
| 2016/0149804 A1* | 5/2016 | Mirza | H04L 45/306 370/392 |
| 2017/0006497 A1* | 1/2017 | Thubert | H04L 47/125 |
| 2017/0116018 A1* | 4/2017 | Miller | G06F 9/45558 |
| 2017/0366452 A1 | 12/2017 | Moisand et al. | |

FOREIGN PATENT DOCUMENTS

| | | |
|---|---|---|
| CN | 104519121 A | 4/2015 |
| CN | 104780096 A | 7/2015 |
| EP | 2930892 | 10/2015 |

OTHER PUBLICATIONS

"Chinese Application Serial No. 201780022510.0, Office Action and Search Report dated Sep. 24, 2019", (w/ Concise Statement of Relevance), 9 pgs.

* cited by examiner

MULTI-PATH VIRTUAL SWITCHING

FIELD OF THE INVENTION

The present disclosure is related to virtual switching, and in particular to virtual switching among multiple data plane data paths to increase switching throughput, and improve data path availability and programmability.

BACKGROUND

A virtual switch instance in a fixed data plane is used in a host platform or acceleration platform with one data path. The virtual switch instance performs packet switching sequentially in the data path. If the data path is broken, the virtual switch cannot forward a packet. If several data planes are provided, each data plane provides a data path for separate virtual switch.

SUMMARY

A virtual switch for packet switching includes an ingress traffic steering manager executing on circuitry and coupled to receive packets from multiple virtual machines or containers. Multiple data plane providers each have a data path coupled to selectively receive the packets from the ingress traffic steering manager. The ingress traffic steering manager classifies the received packets and selects available data paths based on the classification of the packets and a set of distribution rules.

A method includes receiving packets at an instance of an ingress traffic steering manager executing on circuitry, the packets being received from multiple virtual machines or containers, classifying the received packets, selecting a data path for each packet based on the classification of the packets and a set of distribution rules, the data path being selected from multiple separate data plane providers, each data plane provider having a data path, and forwarding each packet to the selected data path for forwarding to one of the multiple destination virtual machines or containers.

A computer readable storage device has instruction stored thereon for execution by a computer to perform operations. The operations include receiving packets at an instance of an ingress traffic steering manager executing on circuitry, the packets being received from multiple virtual machines or containers, classifying the received packets, and selecting a data path for each packet based on the classification of the packets and a set of distribution rules, the data path being selected from multiple separate data plane providers, each data plane provider having a data path; and forwarding each packet to the selected data path for forwarding to one of the multiple virtual machines or containers.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

A virtual switch is a fundamental component of a virtual network, which intelligently forwards the data packets toward their destination. In a converged virtual network environment, different types of network traffic may be mixed. For example, storage traffic is mixed with voice/video and similar flows with strict latency/jitter requirements, as well as with general Ethernet traffic. A high volume of storage traffic could block the processing for the voice/video flows with low latency requirements in the data path of virtual switch. Networking scalability (i.e. the density of virtual machines or containers on a physical host) may be restricted by the throughput of the data path of a virtual switch. A virtual switch may be implemented with software running on a server and performs packet switching by inspecting packets and intelligently directing the packets toward their destination via one or more data paths. The virtual switch may also be implemented in firmware or hardware on the server.

A virtual switch with multiple data paths performs packet switching concurrently on different data paths. In various embodiments, the multiple data paths are managed by a traffic steering manager with a policy that specifies use of the data paths for switching of packets. If one data path is broken, packets will not be distributed to the failed data path.

Figure 1:
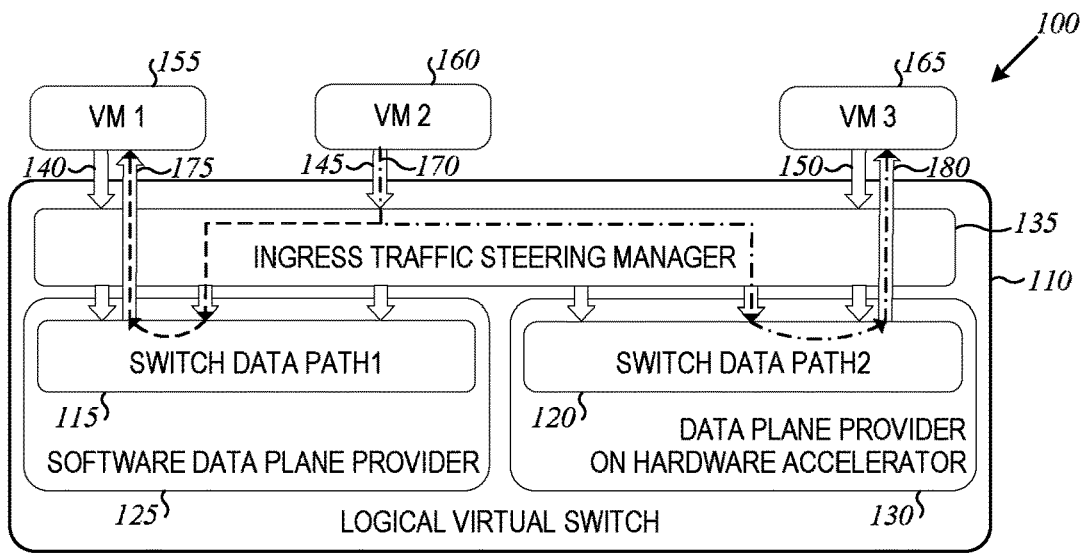
FIG. 1 is a block architecture diagram of a system that utilizes concurrent multipath virtual switching on heterogeneous platforms according to an example embodiment.

FIG. 1 is a block architecture diagram of a system 100 that utilizes concurrent multipath virtual switching on heterogeneous platforms. System 100 includes a new virtual switch instance 110 designed with one or more data paths 115 and 120 which are created on different data planes 125, 130. The data planes 125 and 130 may be implemented in software running on a host system as indicated at 125 or in hardware as indicated at 130 running on a hardware accelerator, so that each data path 115, 120 respectively, has different capacity, throughput, latency, etc. A first data path, data path 1 at 115 is created on the software data plane provider 125 and a second data path, data path 2 at 120 is created on hardware data plane provider 130. The multiple data paths 115, 120 (i.e. multiple data pipeline) of the same virtual switch instance 110 may serve a same set of virtual network interface cards (NICs) simultaneously. A module referred to as an ingress traffic steering manager 135 in the virtual switch 110 classifies ingress traffic flows indicated at 140, 145, and 150 from respective virtual machines indicated at 155, 160, and 165 and labeled as VM1, VM2, and VM3. The term "virtual machine" is also used to represent containers, which involve the partitioning of a single physical Linux machine into multiple smaller independent units, referred to as containers. The ingress traffic steering manager 135 distributes each flow to one of the data paths 115, 120 based on the latency requirement of flow, the capacities of data paths, data path status and workload on each data path. The virtual switch performs packet switching for different flows concurrently, and largely increases the overall throughput of the single virtual switch 110. If one data plane is broken, traffic will be distributed to other available data planes.

In various embodiments, the virtual switch 110 may provide one or more advantages, such as increasing overall switching throughput and availability for single switch instance by fully utilizing the system resources. Applying policies to classify and distribute traffic flows to different data paths makes data planes fully programmable. Dynamic load balancing may be performed on the traffic flows between different data planes via the ingress traffic steering manager.

The accelerator hardware 130 is considered as a heterogeneous platform from a host platform which runs the software data plane 125. Different data path software may run on host platform 125 and the accelerator platform 130 at the same time to serve the same virtual NIC. Since multiple data planes provided by different software implementations and/or hardware accelerators can coexist in the same system in the host or acceleration platform, more than one data path can be created on different data planes in the system for the same virtual switch instance.

The concurrent multipath virtual switch 110 running on heterogeneous platforms may be implemented by supporting the co-existence of multiple data paths with different data planes implemented in software and/or hardware accelerators. The distribution of traffic flows among multiple data paths by the ingress traffic steering manager 135, utilizing a policy specifying traffic classification rules, provides the ability to use multiple data paths of the same virtual switch instance to perform packet switching concurrently for different flows.

FIG. 1 illustrates one example traffic flow from VM2 to VM1 and VM3 using different data paths as indicated by broken line 170. The ingress traffic steering manager 135 receives traffic flows from VM2 and forwards packets in the traffic flow to VM1 and VM3 respectively. All ingress traffic from VM2 are handed over to the ingress traffic steering manager 135 first. The steering manager 135 classifies the traffic flows by checking the input virtual interface to identify a source of the packet, and/or parsing a packet header. Traffic flow with VM1 as destination is distributed to data path1 at 115. Traffic flow with VM3 as the destination is distributed to data path2 at 120. Data path1 115 processes the packets from VM2 and forwards the packets to a port 175 connected with VM1 by using pre-configured forwarding rules in the policy. Data path2 120 processes the packets from VM2 and forwards the packets to a port 180 connected with VM3 by using the pre-configured forwarding rules. Ports 175 and 180 are also representative of the virtual network interface card.

Figure 2:
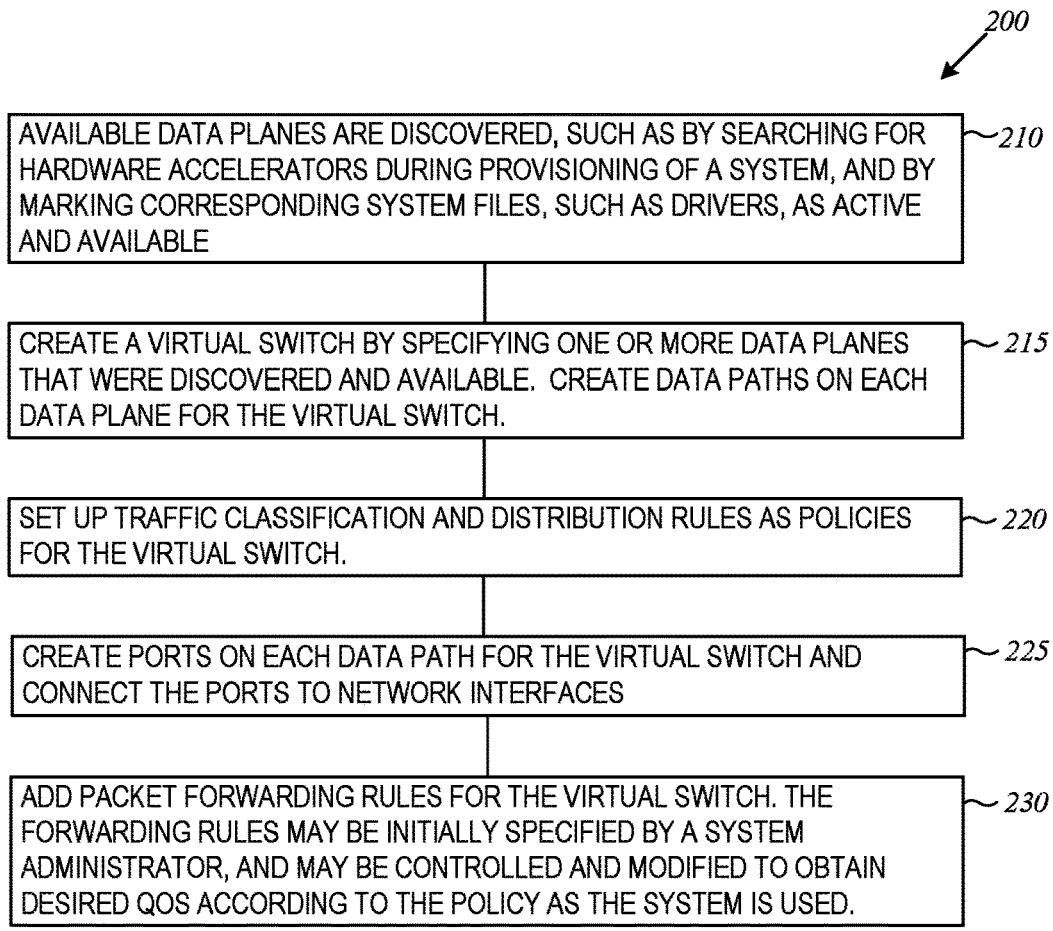
FIG. 2 is a flow diagram illustrating a method to create a multipath virtual switch according to an example embodiment.

FIG. 2 is a flow diagram illustrating a method 200 to create a multipath virtual switch. At 210, available data planes in the system 100 are discovered. Discovery of the data planes may be done by searching for hardware accelerators during provisioning of a system, and by marking corresponding system files, such as drivers, as active and available. Software based data planes are assumed to be always available.

At 215, a virtual switch is created by specifying one or more data planes that were discovered and available. Data paths will be created on each data plane for the virtual switch.

At 220, traffic classification and distribution rules are set up as policies for the virtual switch. Ports for the virtual switch are created at 225, the ports are connected to network interfaces. The ports will be created on each data path.

At 230 the packet forwarding rules for the virtual switch are added. The forwarding rules may be initially specified in one embodiment by a system administrator, and may be controlled and modified to obtain desired service level agreement (SLA) according to the policy as the system is used.

In various embodiments, traffic may be classified in order to implement control plane policies. A traffic class is a set of flows that share a common administrative policy. Traffic classification is charged to implement control plane policies with regard to traffic classes. Packet flow can be identified with one or more of physical or virtual network interface information, Ethernet type, destination MAC (medium access control layer), VLAN (virtual local area network) or multiprotocol label switching (MPLS) label, source and destination IP (internet protocol) addresses, transport layer source and destination ports, packet priority (VLAN, IP MPLS), user defined fields relative to L2/L3/L4 layer headers, or combinations/tunnels of each. In one embodiment, the traffic classes may include storage traffic, voice, video, general Ethernet traffic, and similar types of traffic with different latency/jitter requirements.

Typically, a data plane with a software-only implementation would have higher CPU overhead and may not scale as well as a data plane with hardware accelerated implementation. Different accelerators offer a wide variety of hardware acceleration and offload features that enable significant variability in how packets are processed by the device, hence provide the data planes with variety of throughput, latency, etc.

Since data paths created on different data planes have different capabilities for forwarding packets, the traffic distribution algorithm may be designed by considering the following factors to ensure the maximum Quality of Service and to load balance the traffic flows among data planes: distribution rules for traffic classes defined by control plane policies, data path capabilities, data path status, and/or current workload on each data path. The distribution rules in one embodiment may be defined as the latency requirement of traffic classes, for example.

The ingress traffic steering manager 135 of FIG. 1 performs ingress traffic classification and traffic distribution among all available data paths. Ingress traffic classification is a fine grained parsing function that separates traffic flows into traffic classes. Traffic distribution functions to select a data path for given traffic class may be based on distribution rules, each data path status, and workload on each data path. The steering manager 135 implements control plane policies for traffic classification and traffic distribution. It makes data planes more programmable.

The steering manager 135 may be a single receive point of all ingress traffic, and may be implemented with low overhead. Modern smart NIC/accelerators provide traffic classification acceleration. In some embodiments, the steering manager 135 may be implemented by offloading traffic classification to the accelerator.

In various embodiments, a single virtual switch instance is created with multiple data paths, with each data path created on a different data plane. The virtual switch performs packet switching concurrently on the different data paths that are working. By using a single virtual switch as opposed to multiple virtual switch instances, such as one for each data plane, traffic flows may be dynamically load balanced between the different data planes.

Figure 3:
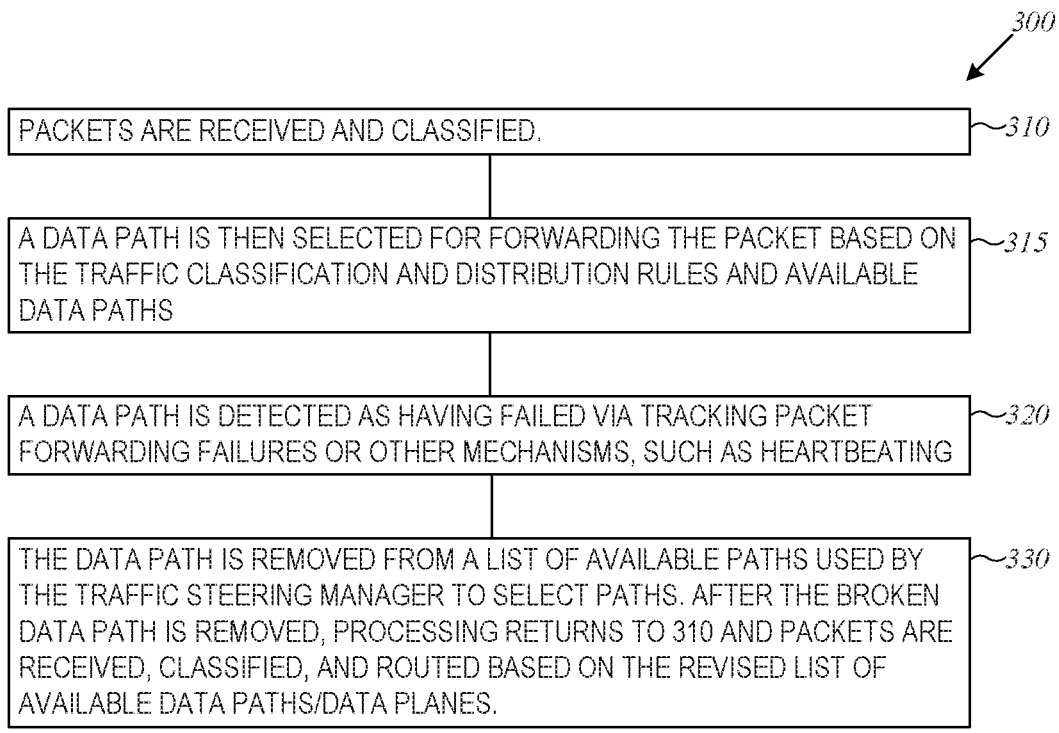
FIG. 3 is a flowchart illustrating a method of handling packet forwarding when a data path fails according to an example embodiment.

FIG. 3 is a flowchart illustrating a method 300 performed by the steering manager 135 when a data path fails. At 310, packets are received and classified. A data path is then selected for forwarding the packet, based on the traffic classification and distribution rules and available data paths as indicated at 315. At 320, a data path is detected as having failed. The detection of a failed data path may be performed by tracking packet forwarding failures or other mechanisms, such as heartbeating. Heartbeating involves data paths generating periodic signals indicative of the data paths still operating. If the periodic signals are not received, it is determined that the data path is broken. Packets already sent to broken data paths may be lost, but can be resent and forwarded by a different data path by the traffic steering manager.

At 330, the data path is removed from a list of available paths used by the traffic steering manager to select paths from that list. After the broken data path is removed, processing returns to 310 and packets are received, classified, and routed based on the revised list of available data paths/data planes.

Figure 4:
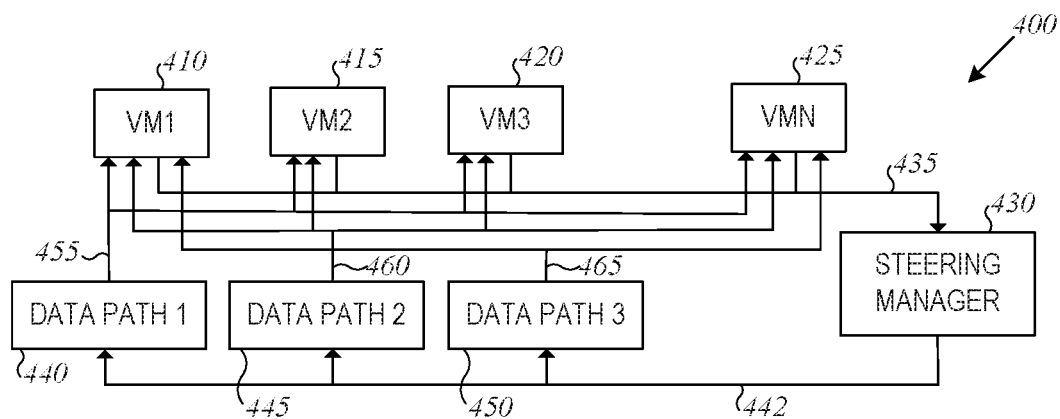
FIG. 4 is a block diagram illustrating a system having concurrent multipath virtual switching with packet forwarding based on available data paths and load balancing according to an example embodiment.

FIG. 4 is a block diagram illustrating a system 400 having concurrent multipath virtual switching with packet forwarding based on available data paths and load balancing according to an example embodiment. System 400 illustrates four virtual machines at 410, 415, 420, and 425. There may be more or fewer virtual machines in further embodiments. Each virtual machine may generate ingress traffic, such as packets, to a steering manager 430 via a communication connection 435. The steering manager 430, as previously described, keeps a list of available data paths 440, 445, and 450 for forwarding packets to destinations. While three data paths are shown, there may be more in further embodiments.

Each of the data paths is on a separate data plane in one embodiment, and the steering manager 430 is an instance of a virtual switch coupled to the data paths via a communication connection 442. Each data path 440, 445, and 450 is coupled via respective communication connections 455, 460, 465 to the virtual machines for forwarding packets to the virtual machines under direction of the steering manager. The communication connection 455, 460, and 465 may represent virtual ports and a virtual network interface card, either software or hardware based.

The data paths and corresponding data planes may be hardware based accelerators or software based data planes. Each data plane may have a different bandwidth capability. In one embodiment, the steering manager utilizes policies to route packets for forwarding to provide throughput of the packets corresponding to the policies for different classes of packets. If one or more of the data paths fails, it is removed from a list of data paths the steering manager uses to perform the load balancing. Traffic that had been directed to the failed data path may be lost, but subsequent packets from the same flow will be routed according with the load balancing based on the available data paths in the list. For instance, if data path 445 fails, the traffic that had been routed to it may be rerouted via one or more of the remaining available data paths 440 and 450.

Figure 5:
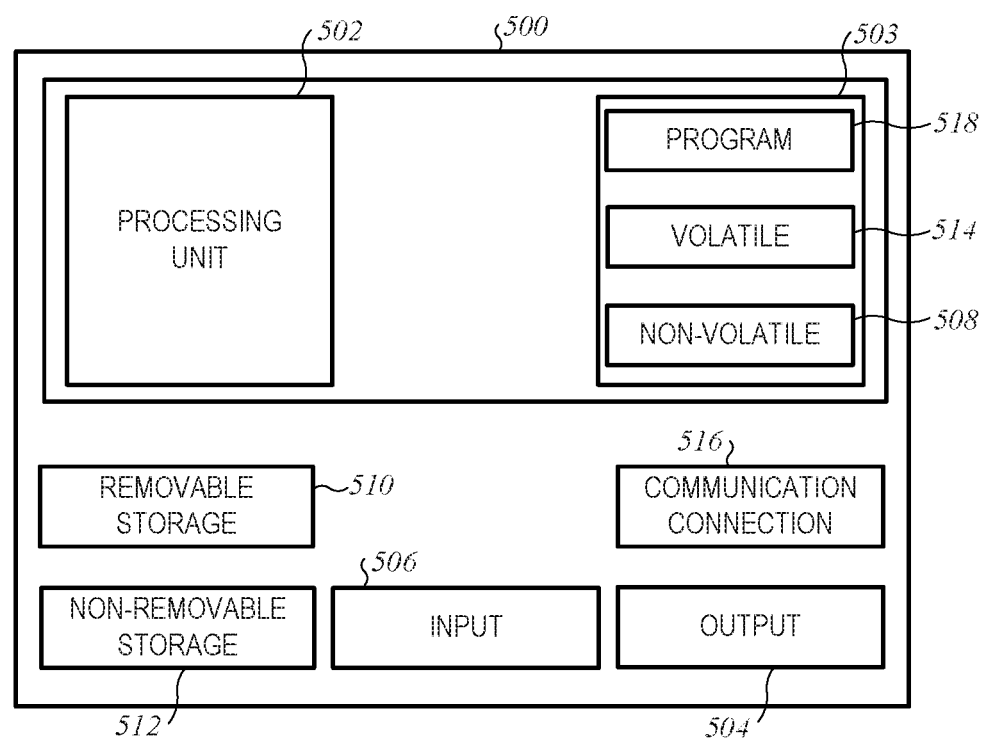
FIG. 5 is a block diagram illustrating circuitry for implementing algorithms and performing methods according to example embodiments.

FIG. 5 is a block diagram illustrating circuitry for clients, servers, cloud based resources for implementing algorithms and performing methods according to example embodiments. All components need not be used in various embodiments. For example, the clients, servers, and network resources may each use a different set of components, or in the case of servers for example, devices with powerful processors and large memory.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may be a blade computer or desktop in a data center for implementing a virtual switch, or other computing device including the same or similar elements as illustrated and described with regard to FIG. 5. Devices, such as blade computers or desktop computers are generally collectively referred to as computer devices or user equipment. Further, although the various data storage elements are illustrated as part of the computer 500.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input 506, output 504, and a communication connection 516. Output 504 may include a display device, such as a touchscreen, that also may serve as an input device. The input 506 may include one or more of a touchscreen, touchpad, mouse, keyboard, camera, one or more device-specific buttons, one or more sensors integrated within or coupled via wired or wireless data connections to the computer 500, and other input devices. The computer in one embodiment operates in a networked environment using a communication connection to connect to one or more remote computers, such as database servers. The remote computer may include a personal computer (PC), server, router, switch, a peer device or other common network node, or the like. The communication connection 516 may include a Local Area Network (LAN), a Wide Area Network (WAN), or other networks. It may in the form of a wired or wireless network interface card.

Computer-readable instructions stored on a computer-readable medium are executable by the processing unit 502 of the computer 500. A hard drive, CD-ROM, and RAM are some examples of articles including a non-transitory computer-readable medium such as a storage device. The terms computer-readable medium and storage device do not include carrier waves to the extent carrier waves are deemed too transitory. For example, a computer program 518 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 500 to provide generic access controls in a COM based computer network system having multiple users and servers.

EXAMPLES

In example 1, a virtual switch for packet switching includes an ingress traffic steering manager executing on circuitry and coupled to receive packets from multiple virtual machines or containers, multiple data plane providers, each data plane provider having a data path coupled to selectively receive the packets from the ingress traffic steering manager, and wherein the ingress traffic steering manager classifies the received packets and selects available data paths based on the classification of the packets and a set of distribution rules.

In example 2, the virtual switch of example 1 wherein at least one data plane provider comprises a hardware accelerator.

In example 3, the virtual switch of example 2 wherein the ingress traffic steering manager offloads received packet classification to the hardware accelerator.

In example 4, the virtual switch of any of examples 1-3 wherein at least one data plane provider comprises a software accelerator stored on a storage device and executable from the storage device on the circuitry.

In example 5, the virtual switch of any of examples 1-4 wherein the ingress traffic steering manager selects available data paths as a function of latency or jitter or both, requirements of the packets.

In example 6, the virtual switch of any of examples 1-5 and further comprising a virtual network interface card coupled to each data plane provider to couple the data plane provider to the virtual machines or containers.

In example 7, the virtual switch of example 6 wherein the data planes each comprise multiple ports to couple the data planes to route packets via the virtual network interface card to the virtual machines or containers.

In example 8, the virtual switch of any of examples 1-7 wherein the distribution rules are a function of maximum quality of service and load balancing of packet traffic flows among the data planes.

In example 9, the virtual switch of any of examples 1-8 wherein packet classification is performed as a function of parsing packet headers, a function of an origin of the packet, or both.

In example 10, a method includes receiving packets at an instance of an ingress traffic steering manager executing on circuitry, the packets being received from multiple virtual machines or containers, classifying the received packets, selecting a data path for each packet based on the classification of the packets and a set of distribution rules, the data path being selected from multiple separate data plane providers, each data plane provider having a data path, and forwarding each packet to the selected data path for forwarding to one of the multiple virtual machines or containers.

In example 11, the method of example 10 wherein the data path is selected from a list of available data paths, and further including detecting a broken data path, and removing a broken data path from the list of available data paths.

In example 12, the method of example 11 wherein at least one data plane provider comprises a hardware accelerator.

In example 13, the method of example 12 wherein the ingress traffic steering manager offloads received packet classification to the hardware accelerator.

In example 14, the method of any of examples 10-13 wherein at least one data plane provider comprises a software accelerator stored on a storage device and executable from the storage device on the circuitry.

In example 15, the method of any of examples 10-14 wherein the ingress traffic steering manager selects available data paths as a function of latency requirements of the packets.

In example 16, the method of any of examples 10-15 wherein the distribution rules are a function of maximum quality of service and load balancing of packet traffic flows among the data planes.

In example 17, the method of any of examples 10-16 wherein packet classification is performed as a function of parsing packet headers, a function of an origin of the packet, or both.

In example 18, a computer readable storage device having instruction stored thereon for execution by a computer to perform operations. The operations include receiving packets at an instance of an ingress traffic steering manager executing on circuitry, the packets being received from multiple virtual machines or containers, classifying the received packets, selecting a data path for each packet based on the classification of the packets and a set of distribution rules, the data path being selected from multiple separate data plane providers, each data plane provider having a data path, and forwarding each packet to the selected data path for forwarding to one of the multiple virtual machines or containers.

In example 19, the computer readable storage device of example 18 wherein the data path is selected from a list of available data paths, and wherein the operations further include detecting a broken data path and removing a broken data path from the list of available data paths.

In example 20, the computer readable storage device of any of examples 18-19 wherein at least one data plane provider comprises a hardware accelerator and wherein at least one data plane provider comprises a software data plane provider.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A virtual switch for packet switching, the switch comprising:
    a memory storage comprising instructions; and
    one or more processors in communication with the memory, with the one or more processors executing the instructions to:
        receiving a set of packets from multiple virtual machines, the set of packets comprising a first packet and a second packet;

classifying the first packet and the second packet;
accessing a capability difference between a software data plane and a hardware data plane;
selecting a first data path of the software data plane for the first packet based on the classification of the first packet, the capability difference, and a set of distribution rules; and
selecting a second data path of the hardware data plane for the second packet based on the classification of the second packet, the capability difference, and the set of distribution rules.

2. The virtual switch of claim 1, wherein the hardware data plane comprises a hardware accelerator.

3. The virtual switch of claim 1, wherein the software data plane comprises a software accelerator stored on a storage device and executable from the storage device by the one or more processors.

4. The virtual switch of claim 1, wherein the set of distribution rules comprises a distribution rule based on one or more of: latency, throughput, and jitter.

5. The virtual switch of claim 1, wherein the set of distribution rules comprises a distribution rule based on one or more of: a maximum quality of service and load balancing of packet traffic flows among the software data plane and the hardware data plane.

6. The virtual switch of claim 1, wherein the classifying of the first packet is based on a header of the first packet.

7. The virtual switch of claim 1, wherein the classifying of the first packet is based on an origin of the first packet.

8. A method comprising:
receiving, by one or more processors, a first packet from a first virtual machine and a second packet from a second virtual machine;
classifying the first packet and the second packet;
accessing a capability difference between a software data plane and a hardware data plane;
selecting a first data path of the software data plane for the first packet based on the classification of the first packet, the capability difference, and a set of distribution rules;
selecting a second data path of the hardware data plane for the second packet based on the classification of the second packet, the capability difference, and the set of distribution rules;
forwarding the first packet to the first data path for forwarding to a third virtual machine; and
forwarding the second packet to the second data path for forwarding to a fourth virtual machine.

9. The method of claim 8, wherein the first data path is selected from a list of available data paths, and further comprising:
detecting a broken data path; and
removing the broken data path from the list of available data paths.

10. The method of claim 9, wherein the hardware data plane comprises a hardware accelerator.

11. The method of claim 10, wherein the classifying of the first packet and the second packet is performed by the hardware accelerator.

12. The method of claim 8, wherein the software data plane comprises a software accelerator stored on a storage device and executable from the storage device by the one or more processors.

13. The method of claim 8, wherein the set of distribution rules comprises a distribution rule based on latency requirements.

14. The method of claim 8, wherein the set of distribution rules comprises a distribution rule based on maximum quality of service and load balancing of packet traffic flows.

15. The method of claim 8, wherein the classifying of the first packet is based on a header of the first packet.

16. The method of claim 8, wherein the classifying of the first packet is based on an origin of the first packet.

17. A computer readable storage device having instruction stored thereon for execution by a computer to perform operations comprising:
receiving a first packet from a first virtual machine and a second packet from a second virtual machine;
classifying the first packet and the second packet;
accessing a capability difference between a software data plane and a hardware data plane;
selecting a first data path of the software data plane for the first packet based on the classification of the first packet, the capability difference, and a set of distribution rules;
selecting a second data path of the hardware data plane for the second packet based on the classification of the second packet, the capability difference, and the set of distribution rules;
forwarding the first packet to the first data path for forwarding to a third virtual machine; and
forwarding the second packet to the second data path for forwarding to a fourth virtual machine.

18. The computer readable storage device of claim 17, wherein the first data path is selected from a list of available data paths, and wherein the operations further comprise:
detecting a broken data path; and
removing the broken data path from the list of available data paths.

19. The computer readable storage device of claim 17, wherein the hardware data plane comprises a hardware accelerator.

20. The computer readable storage device of claim 17, wherein the set of distribution rules comprises a distribution rule based on jitter.

\* \* \* \* \*